US007850572B2

United States Patent
Hwang et al.

(10) Patent No.: US 7,850,572 B2
(45) Date of Patent: Dec. 14, 2010

(54) HYDRAULIC OVER/UNDERSHOOT PROTECTION FOR TRANSMISSION CLUTCH CONTROL

(75) Inventors: KyoungPil Hwang, Ann Arbor, MI (US); Andrew D. Herman, Grand Blanc, MI (US); Michael Kozan, Canton, MI (US)

(73) Assignee: Delphi Technologies, Inc., Troy, MI (US)

( * ) Notice: Subject to any disclaimer, the term of this patent is extended or adjusted under 35 U.S.C. 154(b) by 805 days.

(21) Appl. No.: 11/831,418

(22) Filed: Jul. 31, 2007

(65) Prior Publication Data

US 2009/0036265 A1 Feb. 5, 2009

(51) Int. Cl.
*B60W 10/02* (2006.01)
(52) U.S. Cl. .......................... 477/86; 477/166; 477/174
(58) Field of Classification Search .................. 477/70, 477/86, 87, 166, 174
See application file for complete search history.

(56) References Cited

U.S. PATENT DOCUMENTS

| | | | | |
|---|---|---|---|---|
| 4,898,361 A | * | 2/1990 | Bender et al. | 251/129.05 |
| 5,938,557 A | * | 8/1999 | Greenwood | 475/216 |
| 6,308,725 B1 | | 10/2001 | Lawlyes et al. | |
| 6,334,833 B1 | | 1/2002 | Ochi et al. | |
| 6,929,583 B2 | | 8/2005 | Ayabe et al. | |
| 7,373,234 B1 | * | 5/2008 | Hwang et al. | 701/60 |
| 2005/0205138 A1 | | 9/2005 | Sowul et al. | |
| 2009/0272616 A1 | * | 11/2009 | Wilson et al. | 192/87.11 |
| 2010/0137093 A1 | * | 6/2010 | Collins et al. | 475/127 |

* cited by examiner

*Primary Examiner*—Ha D. Ho
(74) *Attorney, Agent, or Firm*—Thomas N. Twomey

(57) ABSTRACT

A vehicle automatic speed change power transmission control includes a control arrangement with overshoot/undershoot protection logic. The control is used with an electro-hydraulic pressure control module featuring a linear solenoid, and which supplies a hydraulically-actuated clutch configured to effect gear changes. The overshoot/undershoot protection logic is configured to detect when a commanded increase/decrease clutch pressure satisfies a clutch pressure threshold and to then activate the protection logic. Once the protection logic is activated, large command pressures increases/decreases are implemented in a series of stages having variable gains. The first stage has an aggressive gain and achieves 50-80% of the commanded clutch pressure. The second stage has a reduced gain and achieves 90% of the commanded clutch pressure. The third stage has a still further reduced gain and achieves about 100% of the commanded clutch pressure.

10 Claims, 3 Drawing Sheets

HYDRAULIC OVER/UNDERSHOOT PROTECTION FOR TRANSMISSION CLUTCH CONTROL

TECHNICAL FIELD

The present invention relates generally to improvements in clutch pressure controls in a vehicle automatic transmission and more particularly to hydraulic fluid pressure over/undershoot management for transmission clutch pressure control.

BACKGROUND OF THE INVENTION

Hydraulic fluid controls can be found in a variety of automotive applications such as automatic speed change transmissions as well as others. In these applications, it is often desirable to control the pressure of the hydraulic fluid, as seen by reference to U.S. Pat. No. 6,308,725 entitled "APPARATUS FOR CONTROLLING HYDRAULIC FLUID PRESSURE" issued to Lawlyes et al., assigned to the common assignee of the present invention. Lawlyes et al. disclose a smart actuator including a solenoid element and a pressure sensor element, both of which are in electrical communication with a remote control through a wire harness. Lawlyes et al. provide for remote pressure sensing of a solenoid output.

In the specific context of an automatic speed change power transmission, it is known to use electronic transmission control units that are configured to generate electrical signals that control solenoids resulting in the control of fluid flow as well as the pressure in a hydraulic fluid line. As known, the pressure in a hydraulic fluid line can be used to control various other elements in an automatic transmission system including for example a hydraulically-actuated clutch for the engagement of individual gears. By engaging various combinations of gears (e.g., planetary gears in a planetary gear transmission), an automatic transmission system accomplishes the same task as the shifting of gears in a manual transmission. Hydraulically-actuated clutches that are found in transmissions are typically used for engaging a pair of gears (e.g., a pair of rotating members, or alternatively, one rotating member and one non-rotating member) together such that when the clutch is applied, torque can be transmitted from one shaft to the other. Shift changes may also include switching three or more clutches on occasion for certain types of shifts, and herein references to two clutch type shifts could also include the multiple shifts.

An important operating aspect of a hydraulically operated clutch relates to the pressure build-up of the applied hydraulic fluid. In general, fluid flow at a certain applied pressure is sought to be controlled and varied to apply the clutch in order to obtain a desired engagement characteristic, principally with respect to timing and smoothness. It should be appreciated that if the timing of the engagement of one gear with the disengagement of another gear is not coordinately properly, overall shift performance may suffer. It is thus desirable and known in the art to control the clutch pressure.

In this regard, it is known to provide a linear solenoid to control the hydraulic fluid pressure to apply and/or release the clutch. In a linear solenoid, the amount of fluid at a controlled pressure can be varied by changing a solenoid control current. To achieve control of a system including a linear solenoid, it is known to employ software responsive to various inputs to control the current provided to the solenoid. It should be noted that typical hydraulically-actuated clutch arrangements that are fed by a linear solenoid (or are fed by a valve assembly containing a linear solenoid) are provided with either a very small hydraulic fluid accumulator or with no accumulator at all. This arrangement can be susceptible to pressure overshoot and undershoot. Notwithstanding the variety of factors that can cause pressure overshoot and/or undershoot in the pressure control system, a few solutions have been proposed in the art.

One conventional method to prevent or minimize overshoot and/or undershoot in a pressure control system of this type is to translate relatively large requested pressure changes into a series of smaller steps, thus limiting, in effect, the pressure change command in a stepwise fashion. However, such an approach results in a relatively slow response time and in any event may not be applicable to every configuration.

Another conventional method is to employ a hardware solution including integrated circuit (IC) technology using proportional-integral-derivative (PID) control. However, this solution requires determination of PID gains, which in turn depend on how much pressure prevails in the clutch, the fill amount and the like, all of which can result in control problems.

There is therefore a need for a hydraulic clutch pressure control system that minimizes or eliminates one or more of the problems set forth above.

SUMMARY OF THE INVENTION

One advantage of a control arrangement of the present invention is that it provides overshoot and/or undershoot protection that can be implemented using software technology. This approach reduces cost and provides greater flexibility in implementing control strategies. Another advantage of the present invention is that, in one embodiment, a clutch pressure estimator is used, which produces clutch pressure information that allow the system to achieve more accurate overshoot and/or undershoot protection. With the clutch pressure estimator, the control arrangement will understand the value of the current pressure in the clutch, thus providing more accurate and responsive overshoot and/or undershoot protection. Finally, a multi-stage ramp is used where each stage has a progressively reduced gain, which collectively achieves a faster response time than conventional multi-stage but equal gain approaches described in the Background, while at the same time also minimizing or eliminating overshoot and/or undershoot.

An apparatus for controlling hydraulic fluid to a hydraulically-actuated clutch in a vehicle automatic speed change transmission includes an electro-hydraulic pressure control module, an estimator, a pressure-to-current controller and a control arrangement. The electro-hydraulic pressure control module has an outlet configured to provide fluid at an outlet pressure that is variable in accordance with a control current signal. The outlet is in fluid communication with the hydraulically-actuated clutch. In one embodiment, the electro-hydraulic pressure control module includes a linear solenoid.

The estimator is configured to generate a pressure estimation signal indicative of an actual clutch pressure. The pressure-to-current controller is configured to generate the control current signal in response to a control pressure signal. Finally, the control arrangement is configured to generate the control pressure signal in response to (i) a clutch pressure command signal indicative of a desired, commanded clutch pressure and (ii) the pressure estimation signal. The control arrangement is further configured, in accordance with the present invention, to generate the control pressure signal so as to reduce deviations in the actual clutch pressure relative to the commanded clutch pressure.

In a preferred embodiment, the control arrangement includes overshoot/undershoot protection logic. The overshoot/undershoot protection logic is configured to implement large changes in the commanded clutch pressure (i.e., larger than a threshold) as a series of progressively, less-aggressive ramps. Through the foregoing, improved response time is obtained relative to the conventional art while at the same time inhibiting possible clutch pressure overshoot/undershoot.

Other features and aspects of the invention are also presented.

BRIEF DESCRIPTION OF THE DRAWINGS

The present invention will now be described by way of example, with reference to the accompanying drawings.

DETAILED DESCRIPTION OF THE PREFERRED EMBODIMENTS

Figure 1:
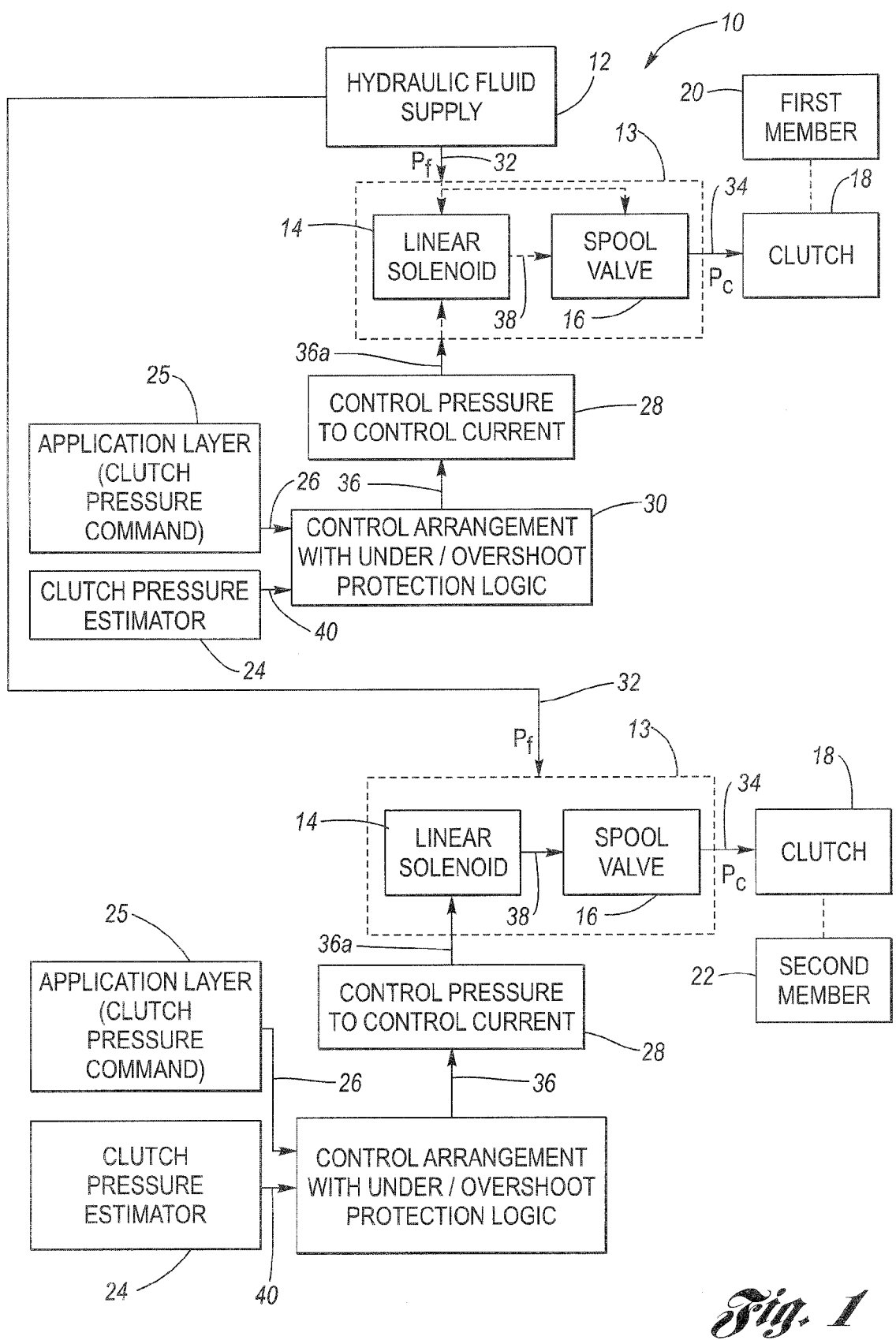
FIG. 1 is a block diagram of an apparatus for clutch pressure control having overshoot/undershoot protection logic in accordance with the invention.

Referring now to the drawings wherein like reference numerals are used to identify identical components in the various views, FIG. 1 is a simplified block diagram of an apparatus 10 for controlling clutch pressure. FIG. 1 shows a hydraulic fluid supply 12, an electro-hydraulic pressure control module 13 including a linear solenoid 14 and a pressure regulating valve 16, a hydraulically-actuated clutch 18, a pair of members 20, 22 in a vehicle transmission, a clutch pressure estimator 24, an application control program/layer 25 outputting a clutch pressure command signal 26, a control pressure-to-control current (solenoid current) mapping block 28, and a control arrangement 30 with over/undershoot protection logic. It should be understood that the pair of members 20, 22 in the illustrated embodiment each may be rotating, but this is exemplary only and not limiting in nature. For example, in alternate embodiments, one of the members 20, 22 may comprise a non-rotating (e.g., gear sets) member. The illustrated embodiment, however, shows the arrangement for a typical shift. On a clutch-to-clutch transmission, for example, a shift is completed by taking one clutch element on and one clutch element off to ring on the different members. The two control structures are shown in parallel because one would use two different circuits to complete the shift (e.g., there would be two solenoids so the algorithm of the present invention would be duplicated to perform the function on both, which are changing pressure at the same time).

Apparatus 10 may be suitably employed in an automatic speed change power transmission of the type described in the Background section. That is, a transmission of the type having hydraulic fluid-actuated (e.g., piston operated type actuation) clutches (e.g., band type clutch), such as clutch 18, configured such that when applied are operative to engage first and second members (e.g., planetary gears, or other rotating members in one embodiment, or one rotating and one non-rotating member in an alternate embodiment) together so that rotating torque may be transmitted from one member to the other or to maintain an otherwise rotatable member stationary, or many other arrangements, such as shown in FIG. 1 described above. As also described in the Background, controlling and varying the hydraulic fluid clutch pressure can materially affect the operating characteristic of the clutch and in turn the resulting engagement of gears.

With continued reference to FIG. 1, hydraulic fluid supply 12 includes an outlet that supplies hydraulic fluid through line 32 to electro-hydraulic module 13. Fluid supply 12 may comprise conventional components known to those of ordinary skill in the art, for example, pumps, pressure regulating devices, valves and the like. Fluid supply 12 provides hydraulic fluid at a nominal feed pressure ($P_F$) in accordance with the design requirements of any particular constructed embodiment.

Electro-hydraulic pressure control module 13 has (i) an inlet configured to receive the supply of hydraulic fluid at the feed pressure, which in FIG. 1 is designated $P_f$, via line 32 as well as (ii) an outlet coupled to a line 34. The outlet is configured to provide hydraulic fluid at a certain fluid flow having an outlet pressure that is variable in accordance with a solenoid control current signal 36a produced by block 28 as a function of a solenoid control pressure signal 36. The module's outlet is in fluid communication with clutch 18 via line 34 and forms a hydraulic fluid circuit therewith. This hydraulic fluid circuit, as known, may include various lines, orifices, and the like and include the hydraulic actuator portion of clutch 18, which may have no fluid accumulator, or only a relatively small accumulator. As described in the Background section, such a configuration may be susceptible to clutch pressure overshoot and/or undershoot, in the absence of the present invention. The clutch pressure developed at clutch 18 is designated as clutch pressure ($P_C$).

Electro-hydraulic pressure control module 13 may include a linear solenoid 14. Linear solenoid 14 may comprise conventional components known to those of ordinary skill in the art. In one embodiment, linear solenoid 14 may comprise a pressure control solenoid (for example, a variable bleed solenoid, or variable flow solenoid), which is a current controlled device that produces a fluid flow at an output pressure on an outlet line 38 that is a function of supply pressure ($P_f$) and an applied current signal (i.e., solenoid control current signal 36a). Additionally, solenoid 14 may be of the type described as being normally "high", meaning that in the absence of an input solenoid current, the output will provide the maximum output pressure, typically an offset from the supply pressure. As the solenoid current is increased, the output pressure on line 38 will decrease. In an alternate embodiment, linear solenoid 14 may comprise a pulse-width modulated (PWM) actuator (not shown) that produces an output pressure as a function of supply pressure and corresponding to the duty cycle of an input drive signal. It should be understood that the present invention is not limited to these two embodiments, which are merely exemplary and not limiting in nature.

Electro-hydraulic pressure control module 13 also includes a pressure regulating valve 16 that is provided with (i) an inlet for receiving a supply of hydraulic fluid as well as (ii) an output configured for connection to clutch 18 via line 34. Valve 16 is configured to provide a fluid flow on line 34 at an output pressure to the clutch that is variable in accordance with a so-called pilot or "control" pressure on line 38 from linear solenoid 14. Pressure regulating valve 16 may be configured to provide flow at a greater level than available with linear solenoid 14, in accordance with the requirements of clutch 18. Valve 16 may comprise conventional components known in the art, for example, in one embodiment, valve 16 may comprise a pilot operated spool valve.

It should be understood that while the described embodiment uses a two-stage module for pressure control that the present invention is not so limited, and may be extended to less than or more than the two-stage illustrated embodiment, and fall within the spirit and scope of the present invention. In addition, for clarity and not by way of limitation, the vocabulary used herein necessarily involves terms specific to a two-stage embodiment, as per its correspondence to the physical two-stage module being described.

Clutch pressure estimator 24 is configured to generate a pressure estimation signal 40 that is indicative of an actual clutch pressure ($P_C$). Estimator 24 is preferably implemented in software and provides a reduced cost embodiment as compared to systems using a physical clutch pressure sensor. Estimator 24 may comprise conventional components and implement conventional strategies as known in the art. However, in one embodiment, estimator 24 may use a state machine, as described in greater detail below, for improved calculation efficiency and pressure estimation accuracy.

Application control program 25 is a higher level control and is configured, for example via programming of a transmission control unit (TCU) or the like, to implement various shifting patterns based on available operating information, such as engine rpm, vehicle speed and other driving conditions. To implement such shifting patterns, as known, the application control program must ultimately cause the engagement and/or disengagement of the various speed change gears, which is accomplished through applying/releasing corresponding clutches. As still further known, the application control program/layer 25 generates a clutch pressure command signal 26, which is a command or signal that is indicative of a desired or commanded clutch pressure. Typically, the application control program 25 generates a clutch pressure profile of the desired clutch pressure level as a function of time, which constitutes the clutch pressure command or signal 26, sometimes referred to herein as the command pressure.

Control arrangement 30 with over/undershoot protection logic is configured to generate a control pressure signal 36 in response to (i) clutch pressure command signal 26 indicative of a desired, commanded clutch pressure and (ii) the pressure estimation signal 40 indicative of the actual clutch pressure. In the context of FIG. 1, the control pressure is the pressure of the hydraulic fluid delivered by linear solenoid 14 on line 38 to spool valve 16. The control pressure signal 26 is indicative of the desired control pressure being delivered by solenoid 14. In accordance with the invention, the control arrangement 30 is further configured to generate control pressure signal 36 so as to reduce deviations in the actual clutch pressure taken with respect to the commanded (desired) clutch pressure to thereby reduce or eliminate overshoot and/or undershoot. In all other respects, control arrangement 30 may comprise conventional components and/or configuration/approaches for translating an input clutch pressure command signal 26 into a corresponding control pressure signal 36.

Control pressure-to-control current (solenoid current) mapping block 28 is configured to perform the function of mapping a control pressure or signal 36 (e.g., as may be expressed in or corresponding to kPa or psi) into a corresponding control current 36a sufficient to appropriately drive linear solenoid 14 so as to realize the desired control pressure. In the embodiment where solenoid 14 is a current-operated linear solenoid, block 28 may be configured with pressure-to-current conversion facilities implemented in software, firmware, hardware or a combination thereof. For example only, block 28 may be configured with a suitable table or tables of P-I (pressure-current) data for solenoid 14, so that for any desired control pressure as an input, a corresponding required solenoid control current output can be determined. In an alternate embodiment where linear solenoid 14 comprises a PWM duty cycle controlled valve, block 28 may comprise pressure-to-PWM conversion facilities including a PWM duty cycle controller. Mapping block 28 may thus comprise conventional components and strategies as known in the art. One of ordinary skill in the art will recognize that variations are possible, depending on the type of solenoid 14 used, and which remain within the spirit and scope of the invention.

Figure 2:
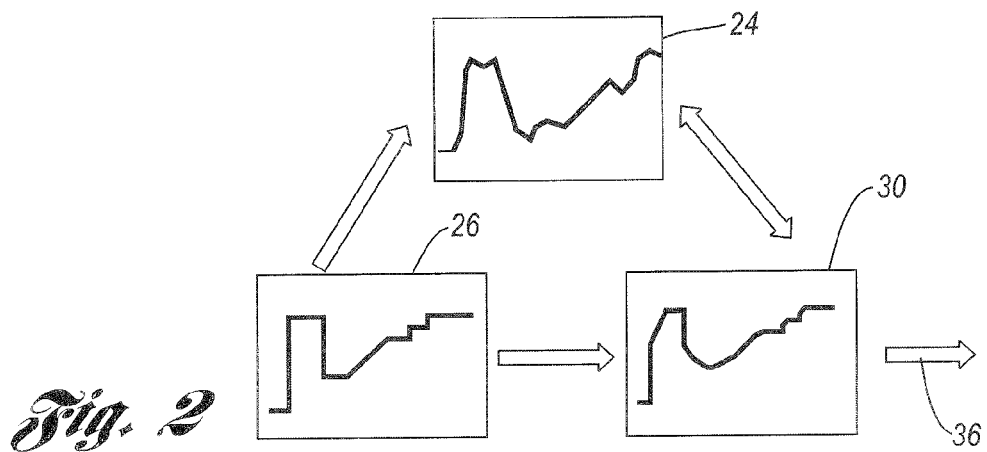
FIG. 2 is a block diagram showing, in multi-chart form, the effect of the present invention.

FIG. 2 is a multi-chart diagram representing the control established by the present invention. Block 26 represents the clutch pressure command signal 26 indicative of the desired clutch pressure. As noted above, this waveform does not take into account or compensate for any tendencies of the hydraulic circuit including linear solenoid 14 and clutch 18 to experience pressure overshoot and/or undershoot. Block 24 represents the pressure estimation signal, which is indicative of the actual current clutch pressure. Block 30 represents the adjustments made to the waveform in block 26 by the overshoot/undershoot protection logic of control arrangement 30. The protection logic is configured to detect when large differences exist between a commanded clutch pressure, on the one hand, and the present, prevailing clutch pressure, on the other hand. If such a large command pressure change were permitted to be directly implemented, there may exist the chance of fluid pressure overshoot/undershoot. In addition, if conventional approaches were followed (i.e., breaking up a large command into a series of fixed increment steps), then this would result in unsatisfactorily long response times. However, when the protection logic of the present invention detects such a large request condition, it is configured to apply a multi-stage, but variable gain series, with rapid increases at the beginning but more restrained increases at the end, fall in order to obtain an improved response time but without overshoot and undershoot common with conventional approaches. As shown, the output is an adjusted or compensated solenoid control pressure signal 36.

Figure 3:
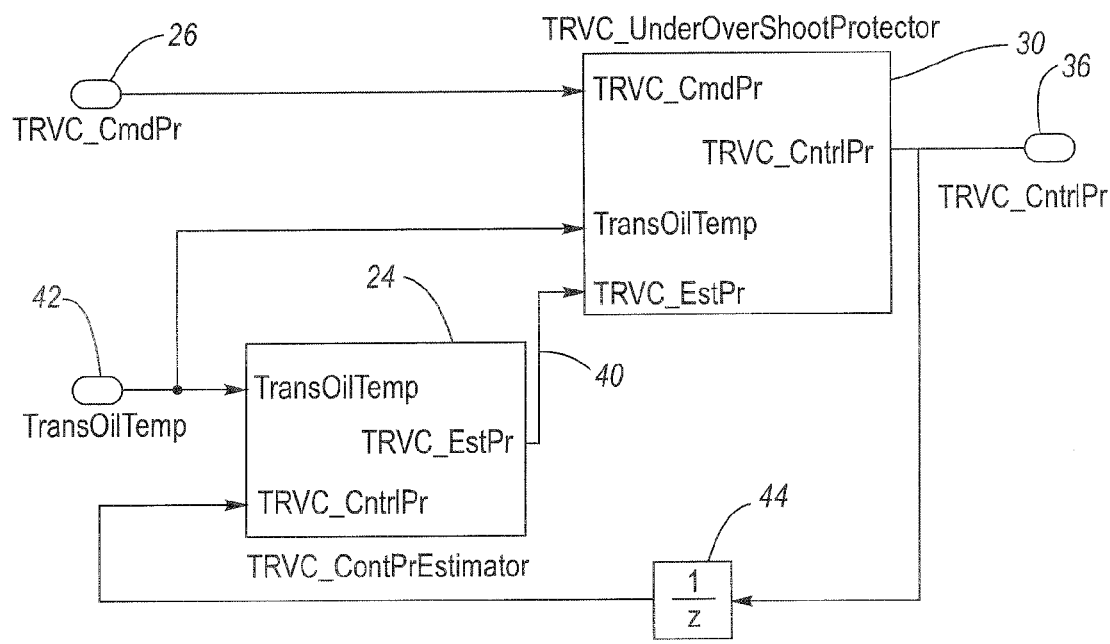
FIG. 3 is a simplified schematic and block diagram showing a clutch pressure estimator and a control arrangement with overshoot/undershoot protection logic.

FIG. 3 is a schematic and block diagram showing in somewhat greater detail estimator 24 and control arrangement 30 with overshoot/undershoot protection logic. The main input is the clutch pressure command signal 26 ("command pressure") from the main application control program 25, while the main output is the control pressure signal 36 (destined for mapping into a solenoid control current 36a). As described above, estimator 24 is configured to generate a pressure estimation signal 40 indicative of an actual clutch pressure. The prime interaction between control arrangement 30 and estimator 24 is to determine when large pressure changes from the present clutch pressure (i.e., pressure estimation signal 40) to the desired clutch pressure (i.e., signal 26) have been commanded, and to thereafter activate the protection logic so as to minimize or prevent overshoot and/or undershoot.

In the illustrated embodiment, the main input signal—signal 26—is designated TRVC_CmdPr; the main output signal-control pressure signal 36—is designated TRVC_CntrlPr; the intermediate signal-pressure estimation signal 40—is designated TRVC_EstPr. Both estimator 24 and control arrangement 30 are responsive to a hydraulic fluid ("oil") temperature parameter 42 indicative of a temperature of the hydraulic fluid. Temperature parameter 42 is also designated TRVC_TransOilTemp in FIG. 3. Transmission oil (fluid)

temperature is a significant element in characterizing the fluid and thus plays a major role in clutch control. Understanding the oil characteristics and using it as a control input is therefore very common in transmission control.

FIG. 3 further shows a feedback element 44, which has an input being coupled to the control pressure signal 36 and an output that is coupled to estimator 24. With this high level description of the interconnections between estimator 24 and control arrangement 30, a detailed description will now be set forth for each, in turn.

Figure 4:
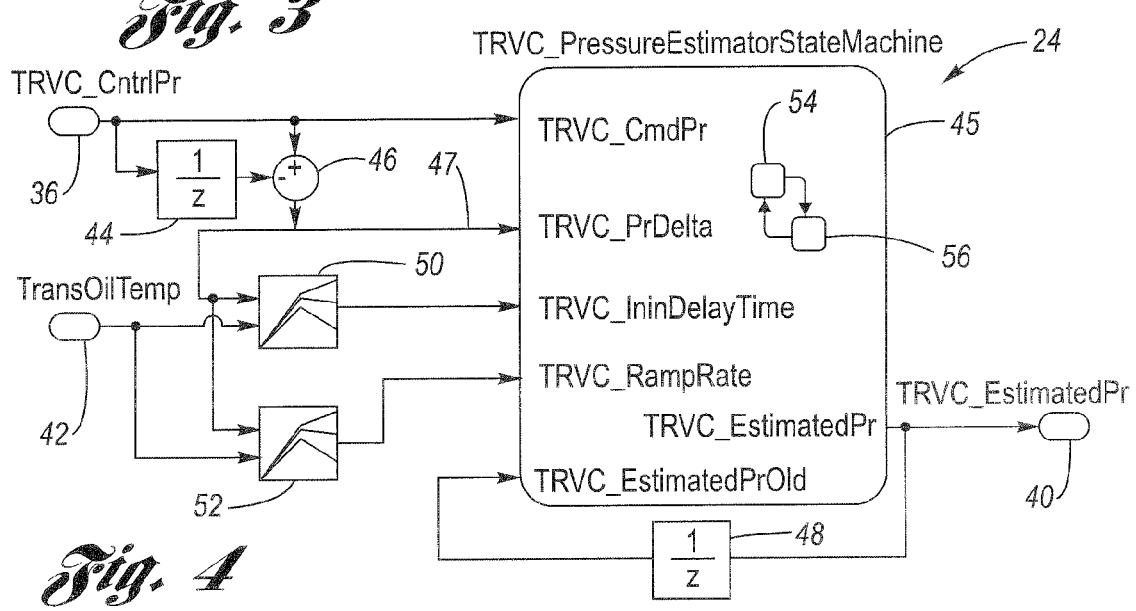
FIG. 4 is a simplified schematic and block diagram showing, in greater detail, the pressure estimator of FIG. 3.

FIG. 4 shows pressure estimator 24 in greater detail. As described above, estimator 24 is used in lieu of an actual clutch pressure sensor, and it should be appreciated that the estimator 24 may preferably be implemented in software. Calculation efficiency, as well as accuracy, are important in order to realize the cost savings of eliminating the sensor while at the same time maintaining the same level of accuracy and responsiveness as an actual sensor. In the illustrated embodiment, estimator 24 includes a two-state state machine 45 to achieve these goals.

Control pressure signal 36, and a delayed version of control pressure signal 36 obtained via delay element 44, are provided to a summer element 46. Summer 46 is arranged so as to generate, in effect, a delta control pressure signal 47 (also TRVC_PrDelta in the FIG. 4). This delta pressure signal 47 is indicative of how much the control pressure has changed over the time increment. Additionally, pressure estimation signal 40 is also applied through a delay element 48 to obtain a delayed version of the pressure estimation signal, designated TRVC_EstimatedPrOld in FIG. 4. Estimator 24 further includes a delay time block 50 and a ramp rate function block 52. As also shown, state machine 45 includes a first state 54 and a second state 56.

In the operation of estimator 24, state machine 45 is configured to assume first state 54 when the delta control pressure 47 is no greater than a predetermined threshold. In the first state, when changes are small, the output of estimator 24, namely pressure estimation signal 40 is essentially at steady state and reflects the clutch pressure that is calculated from the control pressure 36 (i.e., using the steady state relation between the two pressure values). The concept during the first state is that for no changes or for relatively small changes in pressure, tracking will be straightforward and transient deviations will not be significant.

The state machine 45 is further configured to assume the second state 56 when the delta control pressure 47 exceeds the predetermined threshold. Determining the predetermined pressure threshold is contemplated to involve calibration activities. That is, the predetermined pressure threshold is preferably adjustable and variable based on the selected control strategy, and preferably not just a fixed number. When the state machine 45 is in the second state 56, the output, namely pressure estimation signal 40, is determined based on (i) a time delay as specified in time delay block 50, and an initial pressure value; and (ii) a product of ramp rate function 52 and the delta control pressure 47. The concept implemented during the second state 56 reflects that for relatively large increases in pressure, the transient behavior (i.e., response as a function of time) of the system must be accounted for, and may be broken down into the two components described above.

The first component, which may or may not be applicable in any particular circumstance, involves time delay block 50. It should be appreciated that in the hydraulic circuit that includes the clutch 18, there may be a predetermined volume of hydraulic fluid that must flow from electro-hydraulic module 13 to "fill" the clutch 18 before fluid pressure can begin to build. That is, there is a finite volume in the clutch hydraulic circuit that must be first filled. Therefore, for example only, if the clutch pressure is commanded to transition between 0% to 30%, the initial starting value (0%) means that the clutch must first be "filled" before pressure can begin to build up. Thus, in this circumstance, the time delay block 50 is employed to determine at least a component of the overall response defining the pressure estimation signal 40. More specifically, for the time delay specified in block 50, pressure estimation signal 40 will reflect no appreciable build up of clutch pressure (i.e., the clutch is "filling").

The second component relates to the pressure build up after the clutch has been "filled" and involves ramp rate function 52. In this regard, the pressure estimation signal 40 is determined as a product of the ramp rate function 52, which defines how quickly the pressure can increase, the delta control pressure 47, which indicates the amount of the overall pressure increase, and time. In the example above (0%->30%), once the clutch is "filled" the pressure may be determined as a function of time employing these parameters. As a further example, assume that the initial starting pressure is 30% and that the commanded pressure is 70%. In this example, there will be no need to interpose a time delay (as per block 50) since the clutch is already "filled". Accordingly, in scenarios where the clutch is already filled, the pressure estimation signal 40 may be determined in accord with the ramp rate function 52, delta pressure 47 and time. It should be understood that the time delay block 50 and the ramp rate block 52 may vary from system design to system design, and even for the same system design, if for no other reason than manufacturing variance. Accordingly, in a preferred embodiment, both delay 50 and ramp rate 52 are adjustable, and may take the form of a calibration.

Figure 5:
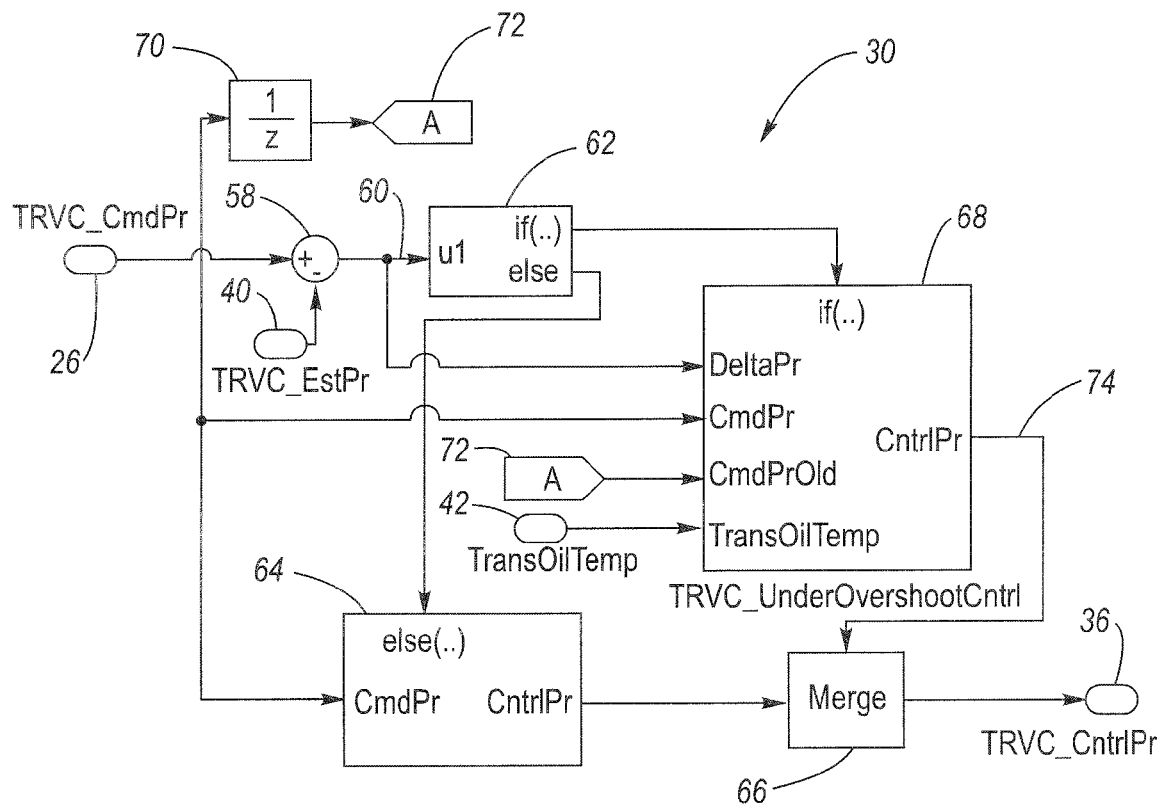
FIG. 5 is a simplified schematic and block diagram showing, in greater detail, the control arrangement with overshoot/undershoot protection logic of FIG. 3.

FIG. 5 shows in greater detail control arrangement 30 with overshoot/undershoot protection logic. Control arrangement 30 frees the application control program 25 from having to consider and account for the transient overshoot and/or undershoot tendencies of the hydraulic circuit, including clutch 18 in combination with linear solenoid 14. The concept reflected in the protection logic portion of control arrangement 30 is to have a multi-stage, variable gain series implementing any large increase in command pressure. That is, in a first stage, a relatively large gain is used by control 30 to achieve 50-80% of the commanded pressure in rapid fashion, in a second stage, a reduced gain is used by control 30 to transition up to about 90% of the commanded pressure in a somewhat less aggressive fashion, and finally, in a third stage, a still further reduced gain is used by control 30 to gradually ease up to and achieve 100% of the commanded pressure. In the illustrated embodiment, control arrangement 30 employs conditional logic, among other functions and structures, to achieve these ends.

Control arrangement 30 includes a summer element 58 configured to determine a pressure differential signal 60 between the commanded pressure (i.e., clutch pressure command signal 26) and the present (estimated) clutch pressure (i.e., pressure estimation signal 40). The pressure differential signal 60 is provided to conditional logic block 62. Logic block 62 is configured to determine whether pressure differential signal 60 is above or below a predetermined threshold. The predetermined threshold for the protection logic can be any value depending on the selected control strategy. If it is desired to set the threshold to a relatively higher value, then the over/undershoot protection logic will not be activated with only a small amount of pressure change. This decision as to control strategy may allow some amount of under/overshoot to occur. However, if it is desired to achieve relatively, very fast response (control), this can be accomplished by setting the threshold to a relatively lower value. It should be understood that the applicability of the present invention does not depend on what kind of control strategy is chosen, and the invention readily accommodates a broad range of selected control strategies, as per the examples given above.

When the pressure differential, as indicated by signal 60, does not exceed the predetermined threshold, then the logic 62 transfers control to block 64. Block 64 is configured to produce a first signal output that corresponds to the clutch pressure command signal 26 being provided to block 64 as an input. The output of block 64 is then provided to a "MERGE" block 66, where it is output as the control pressure signal 36. Thus, for small requested changes in clutch pressure, the protection logic is not activated.

However, if conditional logic 62 determines that the pressure differential, as indicated by signal 60, exceeds the predetermined threshold, then logic 62 transfers control to block 68. Block 68 implements the multi-stage, variable gain strategy described generally above. Inputs to block 68 include the clutch pressure command signal 26, the fluid temperature parameter 42, the pressure differential signal 60, and a delayed clutch pressure command signal 72 obtained by passing signal 26 through a delay element 70. The role of the fluid temperature in the system is as described above.

Through processing of these inputs, described in greater detail below, block 68 provides a multi-stage second signal 74, derived from signal 26, which is then provided to the MERGE block 66. When the control is transferred to block 68, merge block 66 is configured to pass multi-stage signal 74 to the output as control pressure signal 36. Block 66 is configured to output the control pressure signal 36.

Figure 6:
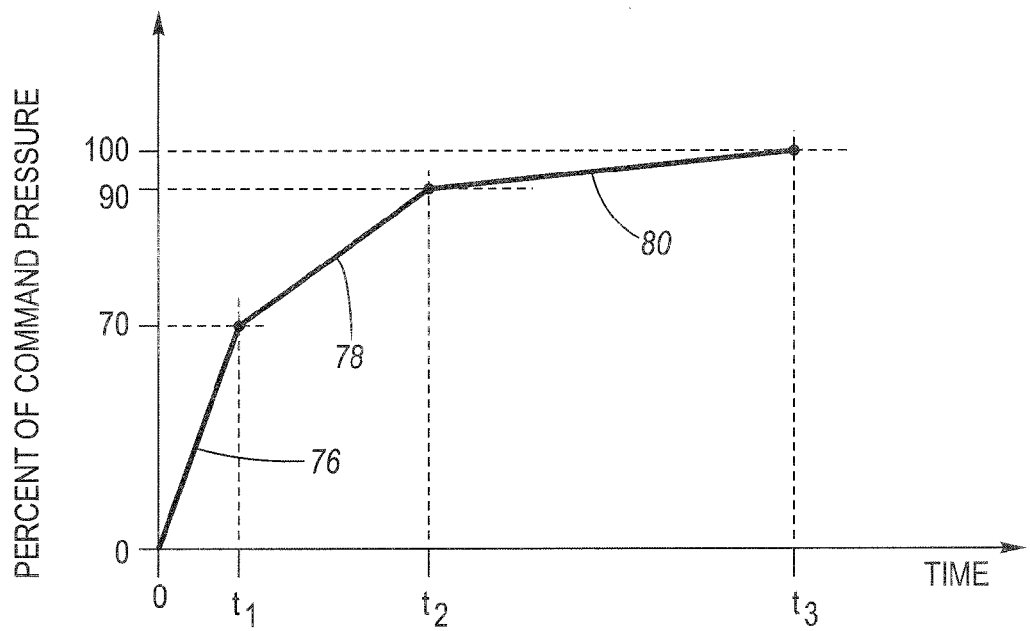
FIG. 6 is a normalized command pressure versus time diagram showing the multi-stage, progressively-decreasing gain approach for implementing large commanded clutch pressure changes.

FIG. 6 is a simplified chart showing the multi-stage, variable gain strategy implemented by block 68 to minimize and/or prevent overshoot and/or undershoot. Specifically, FIG. 6 shows how a relatively large input command pressure is staged out in order to prevent overshoot and/or undershoot while still achieving improved response time. The x-axis represents time while the y-axis represents a percent value normalized relative to the commanded clutch pressure (e.g., 10% corresponds to 10% of the commanded pressure while 100% indicates 100% of the commanded pressure, etc.). FIG. 6 shows a first stage 76 defined between time zero and time $t_1$; a second stage 78 defined between time $t_1$ and time $t_2$, and a third stage 80 defined between time $t_2$ and time $t_3$.

The first stage 76 is a fast, relatively aggressive ramp up stage. During first stage 76, the output control pressure signal 36 corresponds to the product of a first gain (e.g., from 0% to 50-80% between 0 and $t_1$) and the commanded pressure. In the illustrated embodiment, it should be understood that the commanded clutch pressure (command pressure signal 26) is translated by control arrangement 30 to a control pressure 36, corresponding to the desired solenoid output pressure. This is due to the fact that the electro-hydraulic module 13 is of a two-stage configuration. It should be understood that a single stage configuration may also be employed. In either embodiment, the first gain is selected so as to more quickly allow the actual clutch pressure to catch up with the commanded clutch pressure.

During the second stage 78, the output control pressure 36 corresponds to the product of a second gain (e.g., 70% to 90% between $t_1$ and $t_2$) and the commanded pressure. This second stage 78 is a ramp up to approximately 90% of the commanded value. This 10% back-off point is picked so as to build in a safety margin to prevent overshoot, for example.

During the third stage 80, the output control pressure signal 36 corresponds to the product of a third gain (e.g., from 90% to 100% between $t_2$ and $t_3$) and the commanded pressure. This stage 80 is a relatively slow ramp up so as to avoid overshoot and/or undershoot. It is contemplated that the respective gains for the various stages, and the respective time periods for each stage, can be selected from a wide range of values, the particular values of which can be chosen consistent with the desired control strategy (i.e., required or desired response times, etc), among other factors known to those in the art as impacting the response characteristics. It is contemplated that such values may be calibrated for any particular application and its specific requirements.

Through the foregoing multi-stage approach, employing ramped control, overshoot and/or undershoot deviations can be minimized or eliminated. Moreover, by staging the gains, the response time to achieve 100% of the commanded pressure is improved (i.e., reduced time) compared to conventional multi-stage but fixed gain increments.

Clutch pressure estimator 24, mapping block 28 and control arrangement 30 may be implemented, in one embodiment, in an electronic controller, which may be separate (or included with) the control unit in which the main application control program 25 executes. In this regard, such an electronic controller may include conventional processing apparatus known in the art, capable of executing pre-programmed instructions stored in an associated memory, all performing in accordance with the functionality described herein. That is, it is contemplated that the processes described herein will be programmed in a preferred embodiment, with the resulting software code being stored in the associated memory. Implementation of the present invention, in software, in view of the foregoing enabling description, would require no more than routine application of programming skills by one of ordinary skill in the art. Such an electronic controller may further be of the type having both ROM, RAM, a combination of non-volatile and volatile (modifiable) memory so that the software can be stored and yet allow storage and processing of dynamically produced data and/or signals.

While particular embodiments of the invention have been shown and described, numerous variations and alternate embodiments will occur to those skilled in the art. Accordingly, it is intended that the invention be limited only in terms of the appended claims.

The invention claimed is:

1. An apparatus for controlling hydraulic fluid to a clutch in a vehicle automatic speed change transmission where the clutch is configured to couple a pair of members at least one of which is rotatable, comprising:

an electro-hydraulic pressure control module having an outlet configured to provide fluid at an outlet pressure that is variable in accordance with a control current signal, said outlet being in fluid communication with said clutch;

an estimator configured to generate a pressure estimation signal indicative of an actual clutch pressure;

a pressure to current controller configured to generate said control current signal in response to a control pressure signal; and a control arrangement configured to generate said control pressure signal in response to (i) a clutch pressure command signal indicative of a desired, commanded clutch pressure and (ii) said pressure estimation signal, said control arrangement being further configured to generate said control pressure signal so as to reduce deviations in said actual clutch pressure relative to said commanded clutch pressure.

2. The apparatus of claim 1 wherein said estimator includes a state machine having a first state and a second state, said state machine being configured to assume said first state when a delta control pressure is no greater than a predetermined control pressure threshold, said state machine being further configured to assume said second state when said delta control pressure exceeds said threshold, said estimator being configured, when said state machine is in said first state, to determine said pressure estimation signal in correspondence to said control pressure signal.

3. The apparatus of claim 2 wherein said estimator is configured, when said state machine is in said second state, to determine said pressure estimation signal based upon (i) a delay that is determined as a function of a delay parameter corresponding to a clutch fill time; and (ii) a product of a ramp rate function and said delta control pressure.

4. The apparatus of claim 3 wherein said delay is adjustable.

5. The apparatus of claim 3 wherein said ramp rate function is adjustable.

6. The apparatus of claim 3 wherein said estimator is further responsive to a hydraulic fluid temperature parameter.

7. The apparatus of claim 1 wherein said control arrangement includes overshoot/undershoot protection logic configured to generate said control pressure signal, said protection logic being configured to generate said control pressure signal in correspondence with said clutch pressure command signal when a pressure differential indicated by the difference between the clutch pressure command signal and said pressure estimation signal does not meet a predetermined clutch pressure threshold.

8. The apparatus of claim 7 wherein said protection logic, when said pressure differential meets said threshold, is configured to (i) during a first time period, generate said control pressure signal corresponding to a first product of a first gain and said clutch pressure command signal; (ii) during a second time period after said first time period, generate said control pressure signal corresponding to a second product of a second gain and said clutch pressure command signal; and (iii) during a third time period after said second time period, generate said control pressure signal corresponding to a third product of a third gain and said clutch pressure command signal, said first gain being greater than said second gain, said second gain being greater than said third gain.

9. The apparatus of claim 8 wherein said first gain is selected such that said control pressure signal is operative to achieve between about 50-80% of said desired clutch pressure, said second gain is selected such that said control pressure signal is operative to achieve about 90% of said desired clutch pressure, and said third gain is selected such that said control pressure signal is operative to achieve about 100% of said desired clutch pressure.

10. The apparatus of claim 1 wherein said electro-hydraulic pressure control module includes a linear solenoid responsive to said control current signal.

* * * * *